United States Patent [19]

Ravet et al.

[11] Patent Number: 4,842,651
[45] Date of Patent: Jun. 27, 1989

[54] AGENT FOR PRE-TREATMENT OF ROUGH MINERAL MATERIALS FOR PIGMENTARY APPLICATIONS

[75] Inventors: Georges Ravet, St. Genis-Les-Ollières; Catherine Bonnet, Pierre-Bénite; Jacques Mongoin, Lyons, all of France

[73] Assignee: Coatex S.A., Caluire, France

[21] Appl. No.: 149,371

[22] Filed: Jan. 28, 1988

[30] Foreign Application Priority Data

Feb. 11, 1987 [FR] France .................................. 87 01897

[51] Int. Cl.⁴ .............................................. C04B 14/10
[52] U.S. Cl. ..................................... 106/487; 106/499; 524/445; 524/446; 524/447; 523/209
[58] Field of Search .................. 106/308 M, 309, 499, 106/487; 524/445, 446, 447; 523/209

[56] References Cited

U.S. PATENT DOCUMENTS 3,896,065  7/1975  Reardon et al. ..................... 524/446
4,554,307 11/1985 Farrar et al. ........................ 524/446

FOREIGN PATENT DOCUMENTS 1211895  9/1986  Canada .

Primary Examiner—Paul Lieberman
Assistant Examiner—Christine Skane
Attorney, Agent, or Firm—Oblon, Fisher, Spivak, McClelland & Maier

[57] ABSTRACT

A pre-treatment of rough pigmentary mineral materials to eliminate the viscosifying effect of the swelling clays present in said materials used to condition said materials before refining them in an aqueous medium by abrasion or grinding. The method enables the production of refined pigmentary suspensions with a concentration of at least 75% by weight and low viscosity and stable over time. The pre-treatment agent is comprised of acid polymers and/or copolymers containing at least one carboxylate ethylenic monomer. Suspensions with high concentration of pigmentary mineral materials are prepared from the conditioned materials.

15 Claims, 1 Drawing Sheet

AGENT FOR PRE-TREATMENT OF ROUGH MINERAL MATERIALS FOR PIGMENTARY APPLICATIONS

BACKGROUND OF THE INVENTION

1. Field of the Invention:

The invention relates to an agent for pre-treatment of rough mineral materials, containing swelling clays as impurities, intended for pigmentary applications in the form of aqueous suspensions with a dry matter content of at least 75% by weight, rheology stable over time and appropriate to each area of application.

The invention also relates to the new application of the pre-treatment agent in the preparation of suspensions of mineral materials containing swelling clays as impurities, which suspensions are meant to undergo exfoliation, abrasion and grinding actions while having a dry matter content of at least 75% by weight and a rheology appropriate to each application case.

2. Discussion of the Background:

The use of mineral materials such as carbonate, calcium silicate and sulfate as well as titanium dioxide, talc and kaolins for preparing industrial products intended for use in areas of painting, paper coating, fillers for rubber and synthetic resins, etc., has been known for a long time.

These mineral substances do not all possess a natural lamellate or layered structure facilitating their exfoliation, as is the case with certain substances such as the aluminum silicates commonly known by the name kaolin, and one must, therefore transform them by abrasion and/or grinding into a very fine aqueous suspension the constituent grains of which have the smallest size possible, i.e. less than a few microns, to use them as pigments.

The literature has described the importance and complexity of the techniques of abrasion or grinding of mineral substances in an aqueous medium to obtain a partially refined quality enabling a pigmentary application. Thus, in the special case of paper coating, a coating made up of mineral pigments such as kaolins, carbonate and calcium sulfate as well as titanium dioxide, suspended in water, and also containing dispersing and bonding agents as well as other adjuvants such as thickeners and coloring agents are well known.

In recent years, for paper coating, it has become desirable to have pigmentary suspensions with dry matter contents as high as possible in order to be able to improve the paper's size stability, drying conditions and, especially, the physical properties of the layer laid on the substrate, such as brilliance, for example.

To achieve the goal of a higher dry matter content in suspensions of mineral pigments intended for coating, a method was proposed, which consisted of using aqueous suspensions of mineral materials with rough granulometry.

Such a suspension is described, for example, in British Pat. No. 1,204,511 and is accomplished by dispersing chalk whiting, in an aqueous phase, containing 75 wt. % particles smaller than 2 microns, at a 70 to 85 wt. % dry matter concentration in the presence of a dispersing agent which is a sodium salt of polyacrylic acid.

To obtain a chalk whiting with the aforementioned granulometry, it is necessary to do either a dry or a wet grinding. If a dry grinding is done, the mineral materials ground must undergo a selection in order to eliminate as much as possible all particles that are too large.

If a wet grinding is done, the suspension resulting from said grinding is naturally limited to a dry matter concentration of at most 70% by weight due to the increase in viscosity. Thus, the suspension is then subjected to a partial drying to increase the dry matter concentration, or to a total drying, the disadvantage of which is that it causes a partial reagglomeration of the particles, forcing one to perform a size selection on the dried mineral materials.

As the method of obtaining a higher dry matter content in suspensions of mineral pigments meant for coating led to long, complex and therefore costly processes, a second method for achieving this end was proposed.

This second method consisted of using increasingly elaborate grinding agents during the exfoliation or wet grinding operations, facilitating the grinding operation, the dispersion of particles and the maintenance of suspension viscosities at acceptable values.

One type of grinding agent, described in French Pat. No. 2,488,814, composed of an alkaline acrylic polymer and/or copolymer with an average specific viscosity of less than 0.8, is made up of the fraction of this polymer and/or copolymer isolated by means of a polar solvent with a specific viscosity of from 0.3 to 0.8.

This type of grinding agent was essentially used to obtain a pigmentary suspension with a low viscosity and which was stable over time. The agent promoted the increase to 76% by weight of the dry matter content without being able to exceed this threshold.

A second type of dispersing agent, described in French Pat. No. 2,387,911, is composed of a salt of maleic and acrylic acid copolymers with an average molecular weight of from 2,000 to 10,000, making it possible to make pigmentary suspensions of calcium carbonate with a dry matter content of only from 40 to 60% by weight and unable to exceed the higher value.

A third type of grinding agent, described in French Pat. No. 2,531,444, is comprised of acid acrylic polymers and/or copolymers partially neutralized by at least one neutralization agent having at least one monovalent function. Such a grinding agent has made it possible to stabilize the rheologic properties of slurries over time but has not made it possible to increase the dry matter content of these suspensions past the threshold of 76% by weight.

Thus, thrugh the patent literature, the prior art has advocated numerous means of using rough materials during the grinding operation. These means, which were proposed to increase the dry matter concentration of the pigmentary suspensions, simultaneously to lower the viscosity of the suspensions during grinding and finally to prevent the viscosity from increasing over time, e.g. during storage, where shown to be ineffective. Although in many cases favorable results were obtained, poor results were observed when the rough mineral materials meant for pigmentary applications contained swelling clays, even in very low quantity. In this case, the means advocated by the prior art were inoperative with regard to even a slight increase in the dry matter concentrations of the aqueous suspensions subjected to abrasion or grinding.

Moreover, the means advocated often caused a simultaneous increase in the viscosity of these suspensions, this increase causing a mediocre refining of the mineral materials, a difficult manipulation of the pigmentary suspensions in their subsequent applications and sometimes an increase in mass of the suspensions after their grinding.

SUMMARY OF THE INVENTION

Accordingly, one object of the present invention is to provide a method for the pre-treatment of rough pigmentary mineral materials which eliminates the viscosity effects of swelling clays present as impurities in the mineral material.

Another object of the invention is to provide a pre-treatment method for the preparation of aqueous suspensions of highly concentrated pigmentary mineral materials.

These and other objects which will become apparent from the following specification have been achieved by the present method which comprises the steps of (i) obtaining a rough pigmentary mineral material containing a swelling clay, and (ii) contacting the mineral material with a pre-treating agent comprising at least one carboxylatc ethylene containing polymer or copolymer in an amount sufficient to provide a pigmentary mineral material suspension comprising at least 75% by weight of said mineral material.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
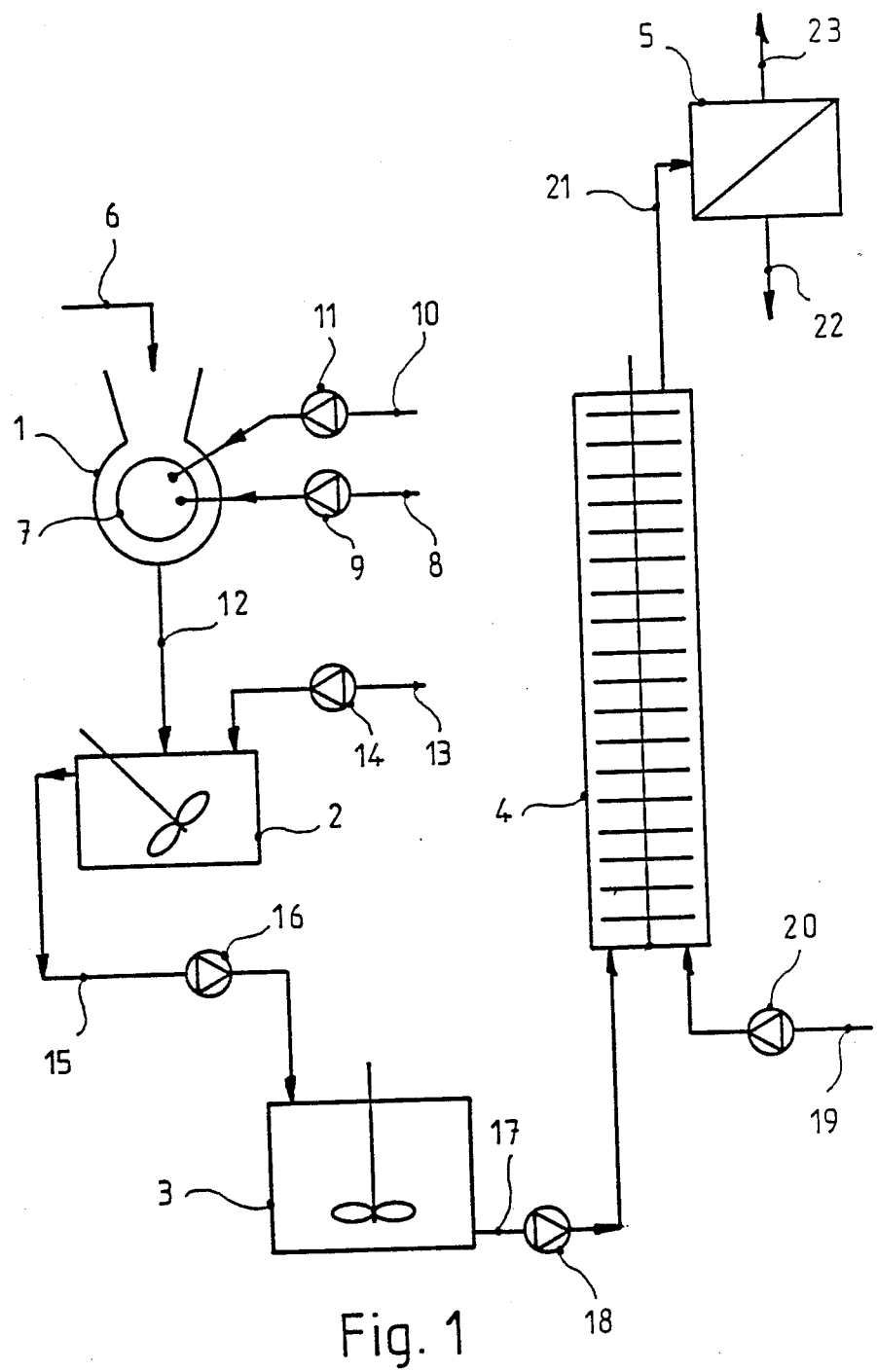
FIG. 1 illustrates a semi-industrial scale installation for the pre-treatment and grinding operations of the present invention.

The present inventors have now found and developed an agent for pre-treatment of rough mineral materials which eliminates the increase in viscosity caused by swelling clays present as impurities in aqueous suspensions highly concentrated in materials to be refined and intended, after refining, for pigmentary applications.

The present pre-treatment of rough mineral materials conditions before refining them in an aqueous medium by abrasion or grinding and is characterized in that, for the purpose of producing refined pigmentary suspensions with concentrations of at least 75% by weight and low viscosity and stable over time, acid polymers and/or copolymers containing at least one carboxylate ethylenic monomer are added to the mineral material.

The prior art has essentially described means applied to the area of grinding or abrasion of rough mineral materials practically devoid of swelling clays. The pre-treatment of the present invention is distinguished from the prior art by the fact that it is implemented not in the grinding stage but in the stage preceding the grinding stage. Its action on the rough mineral materials to be ground consists of preparing, i.e. conditioning them to undrgo the grinding or abrasion stage by placing them in a state such that the dry matter concentration of the aqueous suspensions subjected to the grinding or abrasion stage is greatly increased. The suspensions of pigmentary materials issuing from this stage have an adequate pigmentary granulometry, a low suspension viscosity and are stable over time.

Moreover, the pre-treatment agent that conditions the rough mineral materials appears to be a poor grinding agent when it acts alone. Suspensions of rough mineral materials pre-treated by means of the pre-treating agent and subjected to the grinding stage in an aqueous medium solely in the presence of the agent, even in high quantity, lead to poorly ground, or even impossible to grind, suspensions whose viscosity and size characteristics are poor.

Lastly, the pre-treatment agent, whose action intervenes at a stage of conditioning the rough mineral materials prior to the grinding or abrasion stage, fully cooperates with the grinding agents known in the art. Due to their simultaneous presence, a state of synergy is created, making it possible to obtain refined pigmentary suspensions, highly concentrated in dry matter, with low viscosities and stable, whose pigmentary particles have the desired size for the applications.

Thus, surprisingly, it appears that the pre-treatment agent is not a grinding agent and that it completely fulfills its function in the grinding or abrasion stage when a conventional grinding agent is combined with it during said grinding or abrasion.

As indicated above, the pre-treatment agent is comprised of acid polymers and/or copolymers of at least one carboxylatec ethylenic acid monomer. Monomers which may be used include, but are not limited to acrylic and/or methacrylic, itaconic, crotonic, fumaric, maleic anhydride or isocrotonic, aconitic, mesaconic, sinapic, undecylenic, angelic, hydroxyacrylic, acrolein, acylamide and derivatives thereof, acrylonitrile, the esters of the acrylic and methacrylic acids, especially dimethylaminoethyl methacrylate, imidazoles, vinylpyrrolidone, vinylcaprolactam, ethylene, propylene, isobutylene, diisobutylene, vinyl acetate, styrene and its derivatives thereof, $\alpha$-methylstyrene, methylvinylketone, vinyl chlorides, hydroxylated monomers, more especially the acrylates and methacrylates of ethylene glycol, propylene glycol as well as their phosphated, sulfated, sulfonated or nitrated derivatives.

These acid polymers and/or copolymers result from the polymerization and/or copolymerization according to know processes, in the presence of appropriate initiators and regulators, in an aqueous, alcohol, hydroalcohol, aromatic or aliphatic medium, of at least one of the aforementioned carboxylatc ethylenic monomers.

Thus, the polymerization medium can be water, methanol, ethanol, propanol, isopropanol, butanols, or dimethylformamide, dimethylsulfoxide, tetrahydrofuran, acetone, methylethylketone, ethyl acetate, butyl acetate, hexane, heptane, benzene, toluene, xylene, mercaptoethanol, tert-iododecylmercaptan, thioglycolic acid and its esters, n-dodecylmercaptan, acetic, tartaric, lactic, citric, gluconic, glucoheptonic acids, 2-mercaptopropionic acid, thiodiethanol, the halogen solvents such as carbon tetrachloride, chloroform, methylene chloride, methyl chloride, the esters of monopropyleneglycol and diethyleneglycol.

The polymers and/or copolymers useful as the pre-treatment agent are generally chosen from among those having a molecular weight of from 1,000 to 8,000 and preferably between 3,000 and 6,000.

When polymerization is finished, the acid polymers and/or copolymers in aqueous solution are collected and can be used in this form.

According to an embodiment that has proven to be very interesting, the polymers and/or copolymers in aqueous solution can be partially neutralized by a neutralization agent having a monovalent function and/or polyvalent function. In this case, the neutralization agent is preferably chosen from the group comprised of the hydroxides of alkaline cations, particularly sodium and potassium, and/or the group of hydroxides of alkaline-earth cations, preferably calcium and magnesium.

In the case of a partial neutralization of the active sites of the polymers and/or copolymers according to the invention the neutralization rate is preferably at most 0.40 and preferably no more than 0.20.

In practice, the liquid phase resulting from the polymerization and/or copolymerization and containing the acid polymers and/or copolymers can be used in this form as an agent for pre-treatment of rough mineral materials to be subsequently refined, but it can also be treated by all known methods to eliminate this phase from it and isolate the acid polymers and copolymers in the form of a fine powder than can be used in this form as a pre-treatment agent.

The pre-treatment agent according to the invention can be implemented according to the following stages:

(a) under agitation, a nearly dry impregnation of the rough mineral materials is performed using the pre-treatment agent, (b) into the impregnated medium (a) a small quantity of water is introduced representing at most 25% by weight with regard to the dry state mass of the rough mineral materials, (c) the impregnated medium is mixed until a viscous paste state and/or a granular particle state is obtained, (d) the medium issuing from stage (c) is treated by an aqueous solution of a hydroxide until a pH of about 9 is obtained, and (e) a fluid aqueous suspension is collected.

The pre-treatment agent according to the invention is introduced into state (a) at the rate of 0.05 to 1.0% by weight of active matter with relation to the dry weight of the rough mineral materials to be conditioned. The suspension collected at the end of stage (e) generally has a dry matter concentration of at least 75% and preferably from 75% to 85% by weight. To adjust the concentration of the fluid aqueous suspension collected in stage (e) to between 75% and 85% by weight of dry matter, it may be desirable to introduce an adequate quantity of water according to stage (b).

After the rough mineral materials are conditioned by the pre-treatment agent, the fluid aqueous suspension issuing from stage (e) can be subjected to a grinding or abrasion operation in the aqueous phase according to known methods, in the presence of a known type of grinding agent.

The pre-treatment agent intended for conditioning before abrasion or grinding, rough mineral materials containing swelling clays may be applied to materials as diverse as, for example, carbonates, hydroxides, calcium silicate and sulfate, titanium dioxide, talc, kaolins, ceramic slops, and clay materials containing a metallic element to be developed by hydro-metallurgy.

Other features of the invention will become apparent according to the following descriptions of the exemplary embodiments which are given for illustration of the invention and are not intended to be limiting thereof.

EXAMPLES

Example 1

The purpose of this example is to illustrate the known art and concerns the preparation of a suspension of rough mineral materials meant to be subjected to a grinding to refine it in a pigmentary suspension. Toward this end, several tests were done, some using calcium carbonate from the Orgon calcite bed (France) containing 0.07% swelling clay by weight, others using calcium carbonate from the Omey chalk bed (France) containing 1.1% swelling clays by weight.

The first group of tests (tests 1 to 5) concerns the preparation and grinding of a calcium carbonate suspension in the presence of sodium polyacrylate with an average molecular weight of 4,000 according to French Pat. No. 2,488,814. The second group of tests (tests 6 to 11) concerns the preparation of a calcium carbonate suspension in the presence of a mixed polyacrylate of sodium and calcium (in the ratio Na: 0.7 and Ca: 0.3) with an average molecular weight of 4,000. These tests were conducted according to the same experimental criteria, doing the grinding in the same equipment so that the results obtained could be compared. For each test, an aqueous suspension of calcium carbonate from one of the aforementioned beds was prepared, with a granulometry of less than 43 microns.

The aqueous suspension had a variable dry matter concentration expressed as a percentage by weight with regard to the total mass, according to the quantities indicated in the table below. The grinding agent was introduced into this suspension according to the quantities indicated in the table below, expressed as a weight percentage with regard to the total mass of calcium carbonate to be ground.

The suspension thus prepared was placed in a Dyno-Mill fixed-cylinder turning-impeller grinder whose grinding body was composed of corundum balls from 0.5 to 2.0 millimeters in diameter. The total volume occupied by the grinding body was 1,200 cubic centimeters while its mass was 2,900 grams. The grinding chamber had a volume of 2,500 cubic centimeters. The grinder's circumferential speed was 10 meters per second. The calcium carbonate suspension was recycled at a rate of 18 liters per hour. The output of the Dyno-Mill grinder was equipped with a 300-micron mesh separator, making it possible to separate the suspension resulting from the grinding and the grinding body.

The temperature during each grinding test was kept at 65° C. The grinding time under the aforementioned experimentation conditions varied from 5 to 70 minutes when grinding was possible.

At the end of the grinding, the viscosity of the pigmentary suspension was measured using a Brookfield viscometer at a temperature of 20° C. and a rotation speed of 100 revolutions per minute. After a 24-hour rest period, the viscosity of each suspension was again measured after a brief agitation. Similarly, at the end of each grinding, the granulometry was determined using a Micromeritics 5000 model Sedigraph.

All experimental results for tests 1 to 5 are given in table I and the results for tests 6 to 11 are given in table II.

TABLE I

| MINERAL MATERIALS | TEST No. TYPE | 1 Calcite | 2 Calcite | 3 Calcite | 4 Chalk | 5 Chalk |
|---|---|---|---|---|---|---|
| GRINDING | Suspension | | | | | |
| | pH | 9.3 | 9.4 | 9.3 | 9.5 | 9.4 |
| | Concentration by weight | 76 | 78 | 80 | 76 | 80 |
| | Brookfield viscosity 20° C. 100 rpm | 200 | 265 | 280 | 490 | 2100 |
| | Grinding Agent | | | | | |
| | Type | Poly acrylate | Poly acrylate | Poly acrylate | Poly acrylate | Poly acrylate |
| | Molecular weight | 4000 | 4000 | 4000 | 4000 | 4000 |
| | Neutralization agent | Sodium | Sodium | Sodium | Sodium | Sodium |
| | Neutralization rate | 1 | 1 | 1 | 1 | 1 |
| | Consumption % dry/dry | 1.1 | 1.5 | 1.5 | 0.9 | 1.5 |
| | Grinding Temperature °C. | 65 | 65 | 65 | 65 | 65 |
| | Concentration of the grinding output suspension in % of weight | 76 | 78 | 80 | 76 | 80 |
| | Grinding time in min. | 70 | 28 | 12 | 50 | * |
| SUSPENSIONS AFTER GRINDING | Brookfield Viscosity 20° C. 100 rpm | | | | | |
| | After grinding | 850 | 1100 | 700 | 730 | * |
| | After 24-hour rest | 1280 | 1800 | 900 | 860 | * |
| | Granulometry | | | | | |
| | as % less than 2 microns | 94 | 80 | 66 | 97 | * |
| | as % less than 1 micron | 75 | 50 | 40 | 80 | * |

*Impossible to grind

TABLE II

| MINERAL MATERIALS | TEST No. TYPE | 6 Calcite | 7 Calcite | 8 Calcite | 9 Chalk | 10 Chalk | 11 Chalk |
|---|---|---|---|---|---|---|---|
| GRINDING | Suspension | | | | | | |
| | pH | 9.4 | 9.3 | 9.5 | 9.4 | 9.5 | 9.3 |
| | Concentration by weight | 76 | 78 | 80 | 76 | 78 | 80 |
| | Brookfield viscosity 20° C. 100 rpm | 250 | 280 | 440 | 700 | 1520 | 5300 |
| | Grinding Agent | | | | | | |
| | Type | Poly acrylate | same | same | same | same | same |
| | Molecular weight | 4000 | 4000 | 4000 | 4000 | 4000 | 4000 |
| | Neutralization agent | $Na^+/Ca^{+2}$ | same | same | same | same | same |
| | Neutralization rate | 0.7/0.3 | same | same | same | same | same |
| | Consumption % dry/dry | 1.15 | 1.5 | 1.5 | 1 | 1.5 | 1.5 |
| | Grinding Temperature °C. | 65 | 65 | 65 | 65 | 65 | 65 |
| | Concentration of the grinding output suspension in % of weight | 76 | 78 | 80 | 76 | 78 | 80 |
| | Grinding time in min. | 70 | * | * | 52 | * | * |
| SUSPENSIONS AFTER GRINDING | Brookfield Viscosity 20° C. 100 rpm | | | | | | |
| | After grinding | 350 | * | * | 720 | * | * |
| | After 24-hour rest | 320 | * | * | 780 | * | * |
| | Granulometry | | | | | | |
| | as % less than 2 microns | 95 | * | * | 98 | * | * |
| | as % less than 1 micron | 75 | * | * | 79 | * | * |

*Impossible to grind

Tables I and II show that, by using the prior art described, it is unrealistic to be able to obtain suspensions of calcium carbonate having simultaneously a concentration of more than 76% by weight, a granulometry such that at least 55% of the particles have a size less than 1 micron and a viscosity sufficiently low (at most 2,000 cP immediately after grinding) for the suspension to be manipulable.

Example 2

This example illustrates the present invention and concerns the pre-treatment of the same types of calcium carbonate used in Example 1 and intended, after pre-treatment according to the invention, to undergo a grinding operation. Several tests were done, using, in most cases, "chalks" from the Omey (France) bed containing 1.1% swelling clays by weight.

Test 12 concerns he pre-treatment of a calcite (from the Orgon bed) by means of a polyacrylic acid agent according to the invention, whose characteristics are listed in table III column 12. Test 13 concerns the pre-treatment of a chalk from Omey by means of the same agent as in test 12. Tests 14 and 15 concern the pre-treatment of the same chalk as in test 13 by application of a pre-treatment agent which is the same polyacrylic acid as for tests 12 and 13, but of which 20% of the carboxylic groups were previously neutralized by sodium hydroxide (test 14) and neutralized completely by potassium hydroxide (test 15). These tests were conducted according to the same criteria and in the sam equipment (specific to each stage) so that the results obtained could be compared.

subjected to pre-treatment according to the invention, and then ground, are given in table III below.

TABLE III

| MINERAL MATERIALS | TEST No. TYPE | 12 Calcite | 13 Chalk | 14 Chalk | 15 Chalk |
|---|---|---|---|---|---|
| PRE TREATMENT | Pre-treatment Agent | | | | |
| | Type | Poly acrylic acid | Poly acrylic acid | Poly acrylic acid neutralized 20% NaOH | Poly acrylic acid |
| | Molecular weight | 4000 | 4000 | 4000 | 4000 |
| | Consumption % dry/dry | 0.6 | 0.4 | 0.4 | 0.6 |
| | Neutralization Agent | | | | |
| | Type | Sodium | Sodium | Sodium | Potassium |
| | Consumption | 0.3 | 0.2 | 0.16 | 0.3 |
| | Suspension | | | | |
| | pH | 9.6 | 9.8 | 9.7 | 9.6 |
| | Concentration by weight | 80 | 80 | 80 | 80 |
| | Brookfield viscosity 20° C. 100 rpm | 325 | 685 | 620 | 750 |
| GRINDING | Grinding Agent | | | | |
| | Type | Poly acrylate | same | same | same |
| | Molecular weight | 4000 | 4000 | 4000 | 4000 |
| | Neutralization agent | Sodium | Sodium | Sodium | Sodium |
| | Neutralization rate | 1 | 1 | 1 | 1 |
| | Consumption % dry/dry | 0.6 | 0.9 | 0.9 | 0.6 |
| | Grinding Temperature °C. | 65 | 65 | 65 | 65 |
| | Concentration of the grinding output suspension as % of weight | 80 | 80 | 80 | 80 |
| | Grinding time in min. | 24 | 12 | 8 | 10 |
| SUSPENSION AFTER GRINDING | Brookfield viscosity 20° C. 100 rpm | | | | |
| | After grinding | 800 | 1100 | 1050 | 1200 |
| | After 24-hour rest | 1140 | 2630 | 2500 | 2700 |
| | Granulometry | | | | |
| | as % less than 2 microns | 87 | 89 | 80 | 82 |
| | as % less than 1 micron | 54 | 55 | 48 | 50 |

In a first stage, the pre-treatment stage, the rough mineral materials (calcium carbonate with granulometry from 5 to 43 microns) were introduced into a mixer maintained under steady agitation. Then the pre-treatment agent according to the invention was added (polyacyrlic acid) previously diluted by means of the quantity of water necessary to obtain the desired concentration for the suspension to be ground.

After a sufficient period of time for the mixture composed of the rough mineral materials and the pre-treatment agent to be homogenous, an alkaline neutralization agent was introduced in a quantity such that the pH of the mixture reached a value of between 9 and 10. As the neutralization was occurring, the mixture went from a pasty stage to a very fluid stage.

In a second stage, each aqueous suspension that underwent pre-treatment according to the invention was placed in the same grinding equipment as in Example 1 with the same quantity and the same type of grinding bodies and was treated according to the same experimental criteria as in Example 1 so that the results obtained could be compared. Each aqueous suspension pre-treated and subjected to the grinding operation had a concentration of mineral materials of 80% by weight.

A grinding agent belonging to the prior art was introduced into each suspension to be ground according to the quantities indicated in table III below, expressed as a percentage of weight (dry/dry) with relation to the mass of mineral materials to be ground, then the mixture was ground. All the results obtained on the suspension By comparison with the tables of Example 1, Table III shows a significant increase in the concentration of the suspensions (80% by weight) issuing from a grinding operation when the mineral materials to be ground have undergone a pre-treatment by means of the agent according to the invention. Table III also shows that, in spite of the increase in the mineral material concentration of each suspension, the granulometry is excellent for the pigmentary applications for which these refined materials are intended.

Lastly, Table III shows that, in spite of the high concentration of mineral materials, the suspensions issuing from the grinding operation, after said mineral materials have undergone pre-treatment according to the invention, have a viscosity sufficiently low to be manipulable, while the suspensions issuing from the grinding without having been pre-treated are unusable due to their very high viscosity.

Example 3

This example, which illustrates the invention, concerns the pre-treatment of the same types of calcium carbonate used in Example 1 by means of the pre-treatment agent according to the invention, whose molecular weights were chosen in the selected interval. Several tests were done, using the "chalks" from the Omey (France) bed, containing 1.1 wt. % swelling clays.

Test 16 concerns the pre-treatment of "chalk" using a polyacyrlic acid with average molecular weight of 1,000. Test 17 concerns the pre-treatment of "chalk" with a polyacrylic acid with average molecular weight of 8,000. Test 18 concerns the pre-treatment of "chalk" using a polyacrylic acid with molecular weight of 20,000, showing the limits of the selected molecular weight interval. Test 19 consists of pre-treating a "chalk" by means of a pre-treating agent according to the invention which is a copolymer of acrylic acid (45%) methacrylic acid (40%) and itaconic acid (15%). Test 20 consists of pre-treating a "chalk" by means of a pre-treatment agent according to the invention, which is a polyacrylic acid with average molecular weight of 6,000. These various tests were conducted according to the same criteria and in the same equipment as in Example 2.

In a first stage, the pre-treatment stage, the rough mineral materials (calcium carbonate with granulometry of from 5 to 43 microns) were introduced into a mixer maintained under steady agitation. Then the pre-treatment agent according to the invention was added in the form of an aqueous solution such that the desired concentration for the suspension to be ground would be attained.

After a sufficient period of time for the mixture comprised of the rough mineral materials and the pre-treatment agent to become homogenous, an alkaline neutralization agent was introduced in a quantity such that the pH of the mixture would attain a value of from 9 to 10. As the neutralization was occurring, the mixture went from a pasty state to a very fluid state.

In a second stage, each aqueous suspension, having undergone the pre-treatment according to the invention, was placed in the same grinding equipment as in Example 1, with the same quantity and the same type of grinding bodies and was treated according to the same experimental criteria as in Example 1 so that the results obtained could be compared. Each pre-treated aqueous suspension, subjected to the grinding operation, had a mineral material concentration of 80% by weight.

A grinding agent belonging to the prior art was introduced into each suspension to be ground according to the quantities indicated in Table IV below, expressed as a percentage of weight (dry/dry) with regard to the mass of mineral material to be ground. All the results obtained on the suspensions subjected to pre-treatment according to the invention, and then ground, are given in Table IV below.

TABLE IV

| MINERAL MATERIALS | TEST No. TYPE | 16 Chalk | 17 Chalk | 18 Chalk | 19 Chalk | 20 Chalk |
|---|---|---|---|---|---|---|
| PRE TREATMENT | Pre-treatment Agent | | | | | |
| | Type | Poly acrylic acid | Poly acrylic acid | Poly acrylic acid | Acid copolymer | Poly acrylic acid |
| | Molecular weight | 1000 | 8000 | 20000 | 3000 | 6000 |
| | Consumption % dry/dry | 0.6 | 0.6 | 0.6 | 0.6 | 0.6 |
| | Neutralization Agent | | | | | |
| | Type | Sodium | same | same | same | same |
| | Consumption | 0.3 | 0.3 | 0.3 | 0.3 | 0.3 |
| | Suspension | | | | | |
| | pH | 9.6 | 9.6 | 9.7 | 9.7 | 9.7 |
| | Concentration by weight | 80 | 80 | 80 | 80 | 80 |
| | Brookfield viscosity 20° C. 100 rpm | 520 | 860 | 3360 | 350 | 720 |
| GRINDING | Grinding Agent | | | | | |
| | Type | Poly acrylate | same | same | same | same |
| | Molecular weight | 4000 | 4000 | 4000 | 4000 | 4000 |
| | Neutralization agent | Sodium | same | same | same | same |
| | Neutralization rate | 1 | 1 | 1 | 1 | 1 |
| | Consumption % dry/dry | 0.6 | 0.6 | 0.6 | 0.6 | 0.6 |
| | Grinding Temperature °C. | 65 | 65 | 65 | 65 | 65 |
| | Concentration of the grinding output suspension as % of weight | 80 | 80 | 80 | 80 | 80 |
| | Grinding time in min. | 7 | 5 | * | 7 | 11 |
| SUSPENSION AFTER GRINDING | Brookfield viscosity 20° C. 100 rpm | | | | | |
| | After grinding | 2360 | 3150 | * | 825 | 1200 |
| | After 24-hour rest | 5900 | 8600 | * | 1000 | 1900 |
| | Granulometry | | | | | |
| | as % less than 2 microns | 64 | 55 | * | 65 | 88 |
| | as % less than 1 micron | 39 | 33 | * | 41 | 54 |

*Impossible to grind

Table IV confirms the conclusions of Example 2 and provides the additional information regarding the molecular weight interval claimed for the pre-treatment agent according to the invention. For molecular weights greater than 8,000, the pre-treatment agent loses its effectiveness since it becomes impossible to grind the aqueous suspensions of previously conditioned rough mineral materials. Similarly, it is shown that, for molecular weights less than 1,000, the effectiveness of the pre-treatment agent becomes very low.

Example 4

This example shows the semi-industrial application of the invention in the area of conditioning, by the pre-treatment agent according to the invention, rough mineral materials intended for pigmentary applications after undergoing a grinding at a dry matter concentration of 80.5%. Referring to FIG. 1, a pilot installation was used comprised of a grinder (1) (FORPLEX model), an exfoliation tray (2) equipped with an agitator, a buffer tray (3) kept under agitation, a grinder (4) with micro-elements and a separation zone (5). The rough mineral materials from the chalk bed (Omey-France) containing 1.1% swelling clays by weight and 22% naturally included water by weight was introduced continuously by (6) into the grinder (1) at a rate of 300 kg per hour. The grinder (1) was equipped with a rotor (7) and an output grill (not shown) enabling granulometric selection of materials smaller than 43 microns.

During the grinding in (1), the pre-treatment agent according to the invention, in the form of a 35% aqueous solution by weight, was injected by the circuit (8) equipped with a pump (9). If the water content included in the mineral is less than the quantity necessary to enable the conditioning operation, it is possible to introduce into the grinder (1) by the circuit (10) and the pump (11) a quantity of water necessary for such an operation. The pre-treatment agent was a polyacrylic acid with an average molecular weight of 4,000 already used in tests 12 and 13. The rough mineral materials intimately impregnated with the pre-treatment agent were in the form of a very consistent paste with a concentration of 78% by weight and were brought to the grinder (1) as far as the exfoliation tray by the means (12).

The rough mineral materials present in the tray (2) were then subjected to an exfoliation action while a neutralization agent composed of a solution of sodium hydroxide (at a concentration of 50% by weight) was introduced by circuit (13) equipped with pump (14) so that the pH in tray (2) would be kept at a value of about 9.5. There then formed a very fluid suspension of rough mineral materials which was easily displaced by circuit (15) using pump (16) into the buffer tray (3) equipped with an agitator to insure that the grinder would be regularly fed with micro-elements (4) by the conduit (17) and the pump (18). Simultaneously, a grinding agent in aqueous solution (used for tests 6 to 11) was introduced by the conduit (19) and the pump (20).

The SUSMEYER micro-element grinder (4) was composed of a cylindrical outside envelope equipped with a cooling means (not shown), having a height of 2,160 millimeters and a diameter of 320 millimeters, turning impellers with a tangential peripheral speed of 10 meters per second. The grinding micro-elements were corundum balls with a diameter of 1.0 to 1.6 millimeters, representing a total mass of 290 kg. The feed rate of the suspension to be ground was 250 liters per hour. The intensity of the current consumed was 86 amperes under 380 three-phase volts. The temperature of the suspension entering the grinder (4) was $16 \pm 1°$ C. and the output temperature was 100° C.

At the output of the micro-element grinder (21) there was a separation zone (5) making it possible to divide the pigmentary suspension according to the output (22) and the micro-elements according to the output (23). Three tests (tests 21, 22 and 23) were done, each corresponding to different methods of operation.

Test 21 consisted of conditioning the chalk (Omey-France) by menns of the pre-treatment agent (polyacrylic acid with average molecular weight of 4,000), then neutralizing by an alkaline neutralization agent (sodium hydroxide) up to a pH of 9.7, this neutralization leading to a fluid suspension. The fluid supension was subjected to a grinding without adding the grinding agent normally used. Test 22 consisted of conditioning the same Omey chalk by the same pre-treatment agent as in test 21 in a lower quantity then, after neutralization, a fluid suspension was obtained and subjected to grinding in the presence of a grinding agent identical to that used in tests 6 to 11. Test 23 consisted of conditioning the same chalk (Omey-France) according to the same protocol as the one used in test 21. Additionally at the time of grinding, the same grinding agent, according to the same quantities as test 22 was introduced. All the operating characteristics and results acquired have been assembled in Table V below.

TABLE V

| MINERAL MATERIALS | TEST No. TYPE | 21 Chalk | 22 Chalk | 23 Chalk |
|---|---|---|---|---|
| PRE TREATMENT | Pre-treatment agent | | | |
| | Type | Poly acrylic acid | Poly acrylic acid | Poly acrylic acid |
| | Molecular weight | 4000 | 4000 | 4000 |
| | Consumption % dry/dry | 0.66 | 0.4 | 0.66 |
| | Neutralization Agent | | | |
| | Type | Sodium | Sodium | Sodium |
| | Consumption | 0.33 | 0.2 | 0.33 |
| | Suspension | | | |
| | pH | 9.7 | 9.5 | 9.6 |
| | Concentration by weight | 78 | 78 | 78 |
| | Brookfield viscosity 20° C. rpm | 700 | 380 | 690 |
| GRINDING | Grinding agent | | | |
| | Type | | Poly acrylate | Poly acrylate |
| | Molecular weight | | 4000 | 4000 |
| | Neutralization agent | | $Na^+/Ca^{+2}$ | $Na^+/Ca^{+2}$ |
| | Neutralization rate | | 0.7/0.3 | 0.7/0.3 |
| | Consumption % dry/dry | | 0.4 | 0.4 |
| | Grinding Temperature °C. | 100 | 100 | 100 |
| | Concentration of the grinding output suspension as % of weight | 80 | 80.5 | 80 |
| SUSPENSION AFTER GRINDING | Brookfield viscosity 20° C. 100 rpm | | | |
| | After grinding | 2000 | 900 | 850 |
| | After 24-hour rest | infin. | 640 | 600 |
| | Granulometry | | | |
| | as % less than 2 microns | 90 | 89 | 89 |

TABLE V-continued

| MINERAL MATERIALS | TEST No. TYPE | 21 Chalk | 22 Chalk | 23 Chalk |
|---|---|---|---|---|
| | as % less than 1 micron | 55 | 55 | 54 |

Table V shows and confirms the need to condition the rough mineral materials by the pre-treatment agent according to the invention and to introduce the conventional grinding agent during grinding, into the suspension resulting from the conditioning. Thus, refined pigmentary suspensions exceeding 80% by weight and with an especially favorable rheology are obtained.

As comparison with the prior art, in the same equipment and according to the same grinding operation protocols, four tests (tests 24 to 27) were done on the same Omey chalk, which was not conditioned by the pre-treatment agent according to the invention. All the operating characteristics and results acquired for each of these tests are shown in Table VI below.

TABLE VI

| MINERAL MATERIALS | TEST No. TYPE | 24 Chalk | 25 Chalk | 26 Chalk | 27 Chalk |
|---|---|---|---|---|---|
| GRINDING | Suspension | | | | |
| | pH | 9.4 | 9.5 | 9.4 | 9.3 |
| | Concentration by weight | 73.5 | 76 | 76 | 77 |
| | Brookfield viscosity 20° C. 100 rpm | 250 | 900 | 900 | 1500 |
| | Grinding Agent | | | | |
| | Type | Poly acrylate | same | same | same |
| | Molecular weight | 4000 | 4000 | 4000 | 4000 |
| | Neutralization agent | $Na^+/Ca^{+2}$ | same | same | same |
| | Neutralization rate | 0.7/0.3 | same | same | same |
| | Consumption % dry/dry | 0.6 | 0.8 | 1 | 1.1 |
| | Grinding Temperature °C. | 100 | 100 | 100 | 100 |
| | Concentration of the grinding output suspension as % of weight | 75 | 76 | 78 | 80 |
| SUSPENSION AFTER GRINDING | Brookfield viscosity 20° C. 100 rpm | | | | |
| | After grinding | 400 | 850 | 4000 | 9000 |
| | After 24-hour rest | 400 | 2400 | 10000 | infin. |
| | Granulometry | | | | |
| | as % less than 2 microns | 89 | 89 | 91 | 75 |
| | as % less than 1 micron | 54 | 53 | 57 | 45 |

By comparison with the results of Table V, Table VI regarding the prior art confirms the absolute necessity of using the pre-treatment agent according to the invention to condition the rough mineral materials containing swelling clays as impurities which are to be refined, to produce concentrated pigmentary refined aqueous suspensions with favorable rheologic characteristics. Outside of any conditioning by means of the pre-treatment agent according to the invention, the impossibility of producing usable pigmentary suspensions with a concentration greater than 76% is confirmed.

In order to evaluate the results obtained by using the pre-treatment agent of the invention for preparing a pigmentary aqueous suspension meant for paper coatings, two coating compositions, of the same formula, were made, containing in dry weight parts:

| Pigmentary matter - $CaCO_3$ | 100 |
|---|---|
| Binder - ACRONAL S 360 D marketed by BASF | 10.5 |
| Carboxymethylcellulose (CMC) | 0.5 |

These two coating compositions, formulated from pigmentary suspensions resulting from test 22 (invention) and 24 (prior art) are expressed in the following table.

TABLE VII

| | concentration as % by weight | formula as per invention | formula per prior art |
|---|---|---|---|
| Suspension from test 22 | 80.5 | 124.2 | |
| suspension from test 24 | 75.0 | | 133.3 |
| binder | 50.0 | 21.0 | 21.0 |
| CMC | 100.0 | 0.5 | 0.5 |
| total | | 145.7 | 154.8 |
| dry extract | | 76.1 | 71.7 |
| The rheologies of these two coating compositions were measured using a Brookfield viscometer, module 5, and gave: | | | |
| at 10 rpm | | 14,400 | 15,200 |
| at 100 rpm | | 2,640 | 2,480 |

These two formulas were coated on a 250 mm wide DIXON pilot coating machine equipped with a dragging blade deposit station. The drying was done with an infra-red dryer followed by a tangetial air dryer (BACHOFEN and MEYER Air-Foil). In order to obtain a paper coated on one side with a 15±1 g/m² deposit, it was possible to dry at the following speeds:

120 m/minute for the formula according to the invention,
    85 m/minute for the formula according to the prior art.

Thus, it was possible to obtain sheets of paper coated by means of the formula according to the invention which, before calendering, had a more regular and more brilliant surface appearance than those prepared by means of the formula according to the prior art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of pre-treating a rough pigmentary mineral material containing a swelling clay, comprising the steps of:
   (i) obtaining a rough pigmentary mineral material containing a swelling clay; and
   (ii) contacting said rough mineral material prior to grinding with a pre-treating agent comprising at least one carboxylate ethylenic acid containing polymer or copolymer, in an amount sufficient to provide a pigmentary mineral material suspension after grinding which comprises at least 75% by weight of said mineral material wherein said contacting step comprises:
      (a) impregnating substantially dry rough pigmentary mineral material with said pre-treating agent with agitation,
      (b) adding water to said impregnated mineral material up to an amount at most equal to 25% by weight with regard to said impregnated mineral material,
      (c) mixing said water containing impregnated mineral material to produce a viscous plaste state or a granular particle state,
      (d) treating said viscous paste or said granular particles with an aqueous solution of an alkali or alkaline earth hydroxide to obtain a pH of about 9 to form a fluid aqueous suspension, and
      (e) colleting said fluid aqueous suspension.

2. The method of claim 1, wherein said pre-treating agent results from the polymerization or copolymerization of at least one carboxylate ethylenic acid monomer selected from the group consisting of acrylic, methacrylic, itaconic, crotonic, fumaric, maleic anhydride, isocrotonic, aconitic, mesaconic, sinapic, undecylenic, angelic, and hydroxyacrylic acids.

3. The method of claim 1, wherein said pre-treating agent results from the copolymerization of at least one carboxylate ethylenic acid containing monomer with at least one monomer selected from the group consisting of acrolein, acrylamide, and derivatives thereof, acrylonitrile, esters of the acrylic and methacrylic acids especially dimethylaminoethyl methacrylate, imidazoles, vinylpyrrolidone, vinylcaprolactam, ethylene, propylene, isobutylene, diisobutylene, vinyl acetate, styrene and derivatives thereof, α-methylstyrene, methylvinylketone, vinyl chlorides, hydroxylated monomers, acrylates and methacrylates of ethylene glycol and propylene glycol and phosphated, sulfated, sulfonated or nitrated derivatives thereof.

4. The method of claim 1, wherein said pre-treating agent comprises a carboxylate ethylenic acid containing polymer or copolymer having a molecular weight of from 1,000–8,000.

5. The method of claim 4, wherein said pre-treating agent has a molecular weight of about 3,000–6,000.

6. The method of claim 1, wherein said pre-treating agent is at least partially neutralized by a neutralization agent.

7. The method of claim 6, wherein said pre-treating agent is neutralized at a rate of at most 0.4 and preferably at most 0.2.

8. The method of claim 6, wherein said neutralization agent is selected from the group consisting of alkaline and alkaline-earth metal hydroxides.

9. The method of claim 8, wherein said neutralization agent is selected from the group consisting of sodium, potassium, calcium and magnesium hydroxides.

10. The method of claim 1, wherein 0.05–1.0 weight % of said pre-treating agent relative to the dry weight of said mineral material is used in said contacting step.

11. The method of claim 1, wherein said fluid aqueous suspension comprises at least 75% by weight of said mineral material.

12. The method of claim 11, wherein said fluid aqueous suspension comprises from about 75–85% by weight of said mineral material.

13. The method of claim 1, further comprising:
    grinding or abrading said collected fluid aqueous suspension.

14. The method of claim 1, wherein said rough pigmentary mineral material is selected from the group consisting of carbonates, hydroxides, calcium silicate, calcium sulfate, titanium dioxide, talc, kaolins, ceramic slops, and clay minerals comprising a metallic element.

15. A method of coating paper, comprising applying to said paper a coating of the fluid aqueous suspension of claim 1.

* * * * *